Aug. 5, 1941.　　　W. E. GOBLE　　　2,251,788
OFFSET DISK HARROW
Filed June 5, 1939　　　4 Sheets-Sheet 1
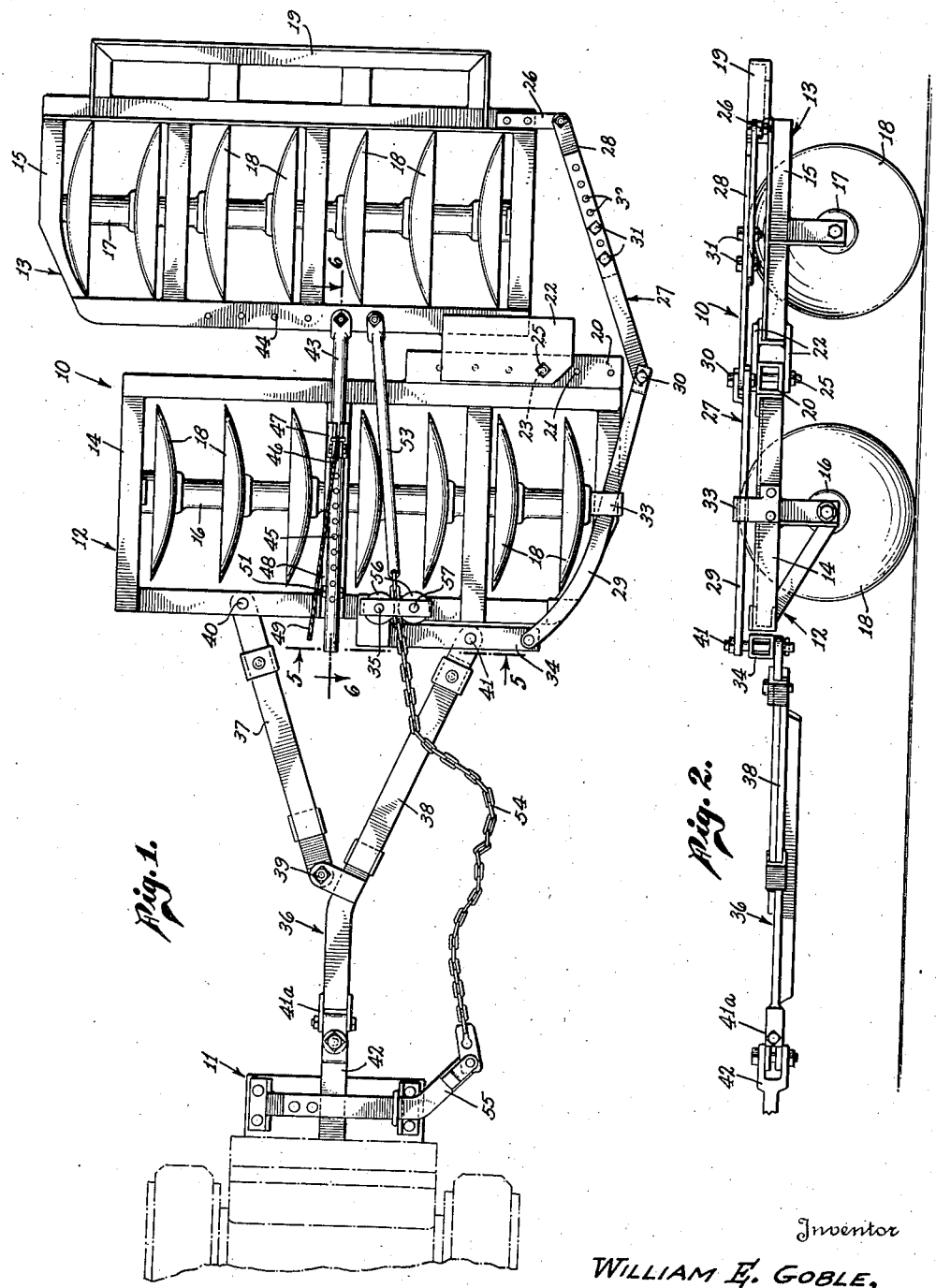
Inventor
WILLIAM E. GOBLE,
By Herbert A. Huebner
Attorney

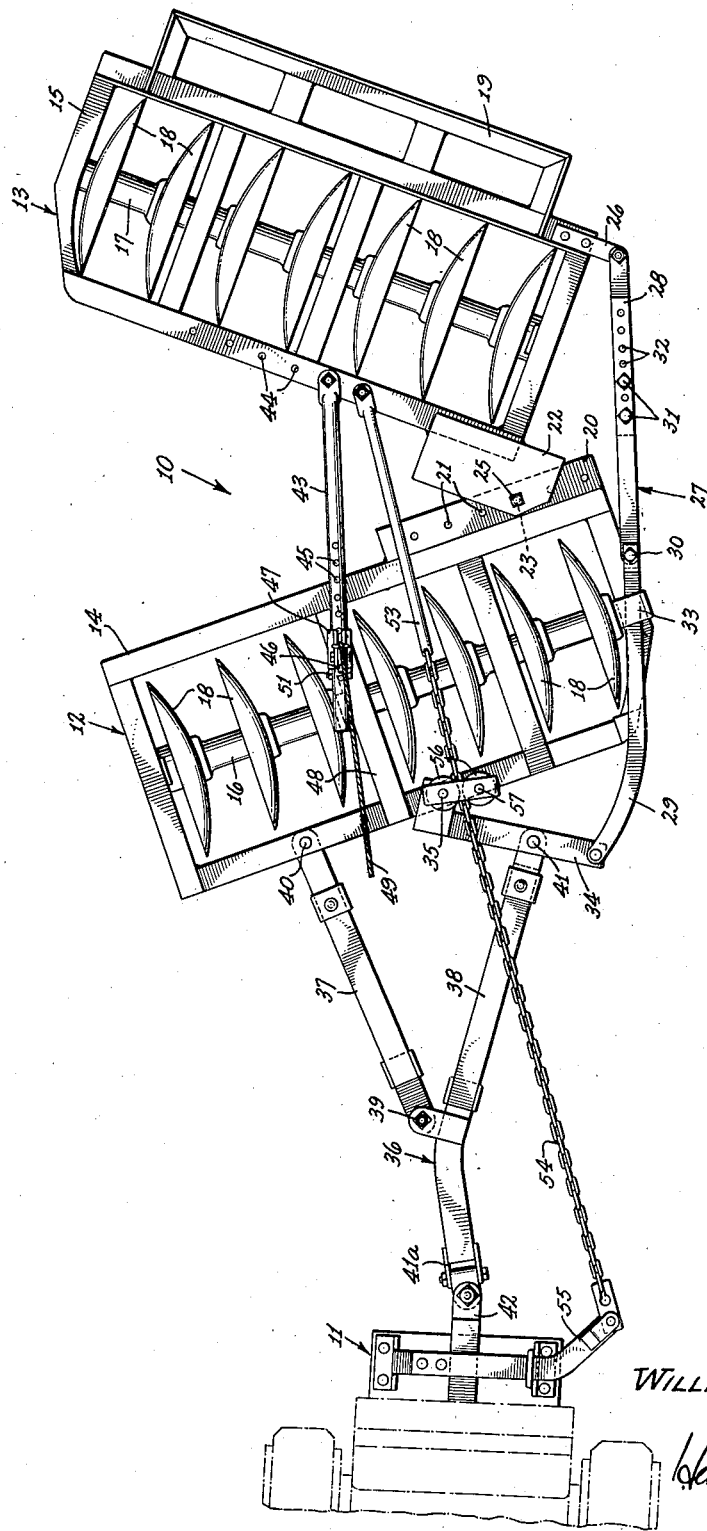

Aug. 5, 1941.  W. E. GOBLE  2,251,788
OFFSET DISK HARROW
Filed June 5, 1939  4 Sheets-Sheet 3

Inventor
WILLIAM E. GOBLE,
By
Attorney

Aug. 5, 1941.     W. E. GOBLE     2,251,788
OFFSET DISK HARROW
Filed June 5, 1939     4 Sheets-Sheet 4
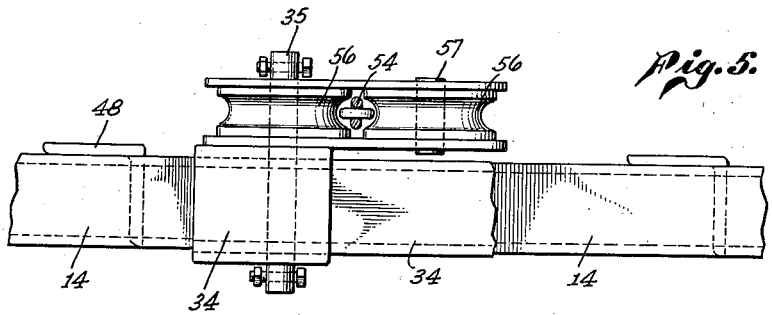
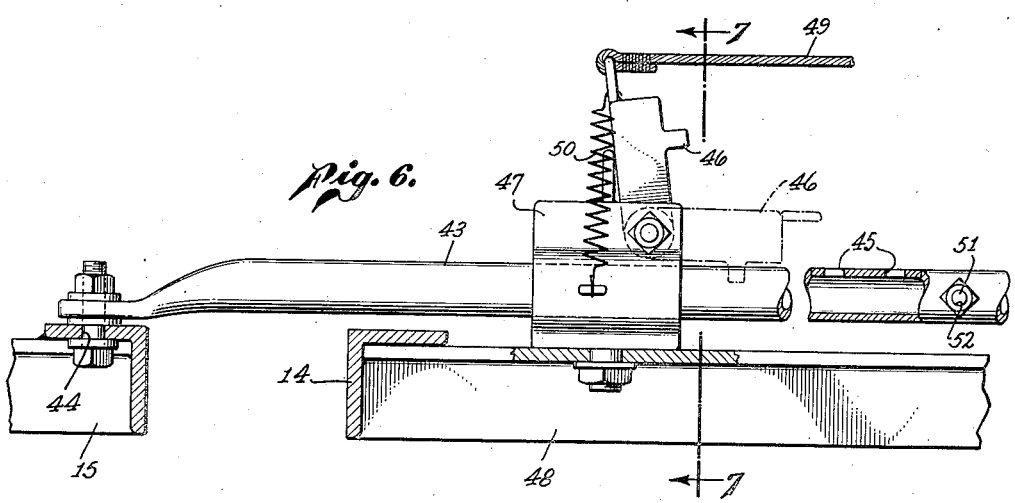
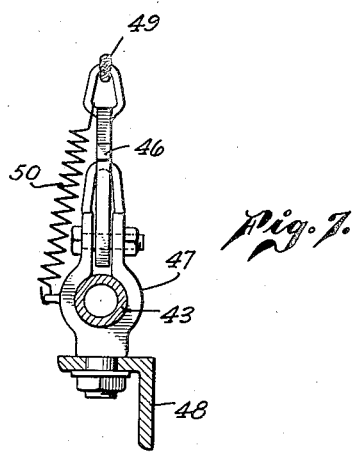
Inventor
WILLIAM E. GOBLE,
By
Attorney Patented Aug. 5, 1941

2,251,788

UNITED STATES PATENT OFFICE 2,251,788

OFFSET DISK HARROW

William E. Goble, Fowler, Calif.

Application June 5, 1939, Serial No. 277,437

11 Claims. (Cl. 55—83)

My invention relates to offset disk harrows, designed particularly for cultivating soil in a path at one side or the other of the tractor or other source of draft power.

The conventional offset disk harrow usually consists of two gangs of disks suitably mounted on axles and frames, with adjustable means connecting the gangs together whereby they may be drawn parallel for idling and angled for working.

When the gangs are adjusted so that they are relatively angled, forming a V, for working, the implement may be turned without difficulty in the direction of the side of the implement on which the gangs are closed, as the disks will follow, due to their planes of rotation being approximately tangential to the arc of the turn.

Difficulty is encountered in turning the implement in the other direction. In fact it is practically impossible to turn the implement in the direction of the side where the gangs are opened, so long as they remain open, due to the disks biting into the soil. If accomplished at all, it is at the expense of strain on the tractor, the parts of the disk harrow, and undersirable gouging of the soil.

Consequently it is desirable to provide means for closing the gangs and holding them closed for turning toward the normally open end of the gangs, as well as for idling.

It is an object of my invention to provide in an offset disk harrow an improved means for connecting the front and rear gangs together, combined with novel draft means, which afford positive adjustment and control of the position of the gangs, superior to that possible with previously known implements.

It is another object of my invention to provide in an offset disk harrow means actuated by the tractor, combined with my linking and draft means, to automatically close the gangs when making a turn in the direction of the normally open end of the gangs.

It is a further specific object of my invention to provide improved means in an offset disk harrow of the type described for positively angling or closing the gangs irrespective of the condition of the soil and independently of any turning operation.

It is another further specific object of my invention to provide in an offset disk harrow of the type described an improved means for latching the gangs in any desired relative position, as well as other means for preventing the gangs from opening beyond a predetermined point.

Further objects and advantages will become apparent from the description and drawings.

In the drawings:

Figure 1 is a top plan view of my disk harrow with the gangs closed for idling.

Figure 2 is a side elevation of the disk harrow.

Figure 3 is a view similar to Figure 1 with the gangs angled for working.

Figure 5 is an enlarged fragmentary front elevation taken on the line 5—5 of Figure 1.

Figure 6 is an enlarged fragmentary section taken on the line 6—6 of Figure 1.

Figure 7 is a section taken on the line 7—7 of Figure 6.

Figure 4:
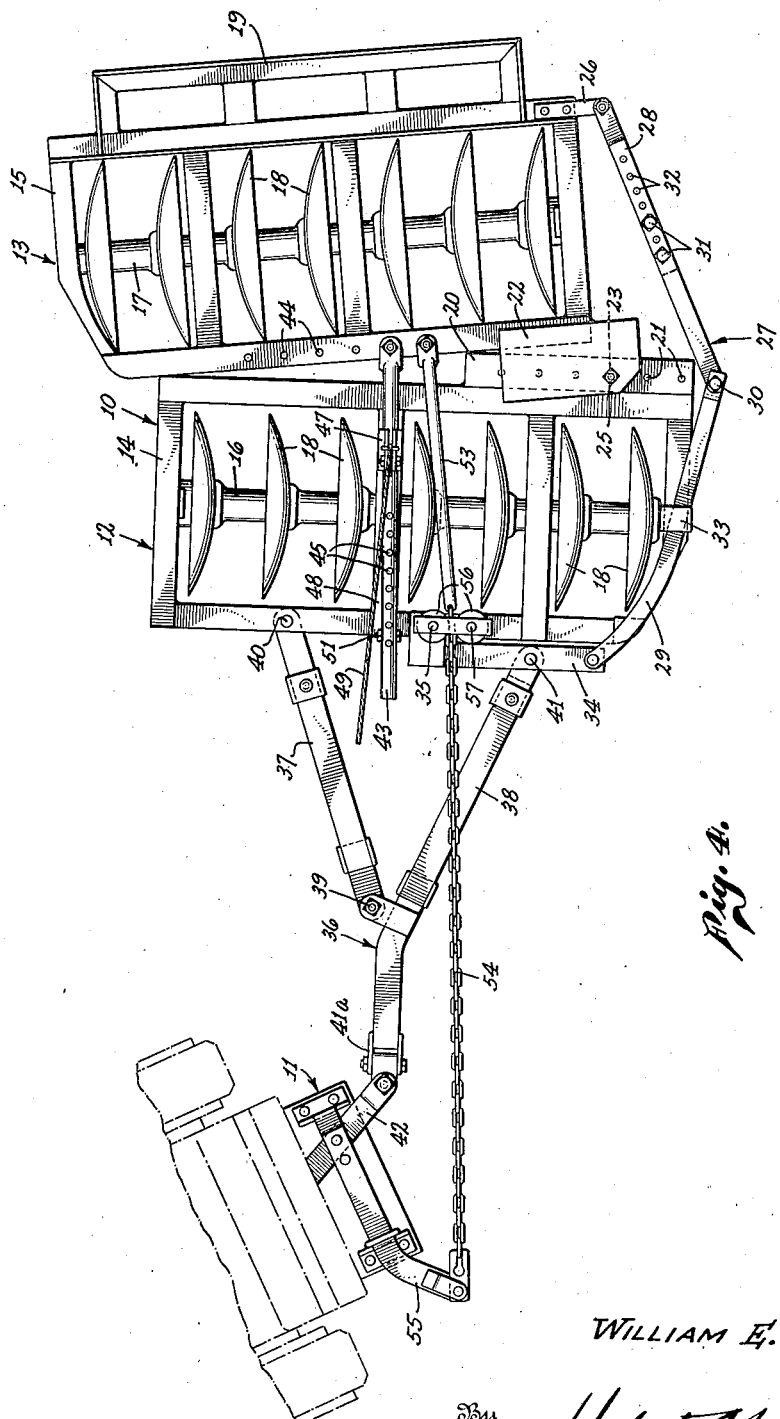
Figure 4 is a similar view showing the gangs closed when turning in the direction of the normally open end of the gangs.

The offset disk harrow is generally indicated by the numeral 10, and a tractor hitch by the numeral 11.

The harrow comprises a front gang 12 and a rear gang 13. The gangs include frames 14 and 15 respectively, which support axle and bearing assemblies 16 and 17, and the latter rotatably carry a plurality of disk blades 18. These blades are oppositely concaved as illustrated, in accordance with conventional design.

I prefer to utilize the construction of axle and bearing assembly patented in my United States Letters Patent Reissue No. 21,145, granted July 11, 1939, and No. 2,020,545, granted November 12, 1935, but am not limited to those structures in my present invention.

On the rear frame is supported a weight box 19, which may be optionally used according to standard practice.

On the rear part of the front frame 14 is welded or otherwise fixed a box 20 having a plurality of holes 21.

On the corresponding end of the rear frame 15 a bracket member 22 is welded or otherwise fixed. It is formed with holes 23 adapted to register with any pair of the holes 21 when the bracket member 22 is positioned over the box 20.

A bolt or pivot pin 25 is inserted through the holes 23 and 21, thus providing a single pivotal connection between front and rear gangs toward one end of the gangs. The preferred point of coupling is illustrated, where the pivot is inside the end disk of the front gang and outside the end disk of the rear gang. This general form of pivoted coupling is shown in my copending application, Serial No. 199,913, filed April 4, 1938.

Adjustably bolted to the rear corner of the rear frame on the same end as the bracket member 22 is an arm 26.

Pivoted to the outer end of this arm is a control bar 27, in two principal sections 28 and 29 hinged together at 30. The rear section 28 is in two parts, as illustrated particularly in Figure 2, providing for adjustment of the length of this section by shifting bolts 31 to the selected holes 32 of a series. This control bar is jackknifed when the gangs are closed, and approximately straight when they are open.

The forward section 29 is loosely supported for sliding movement in a collar 33 fixed upon the front frame. This section is curved inwardly toward its forward end as shown, and is pivotally connected at this forward end with a swingable arm 34. The arm 34 has its other end pivotally anchored on the forward part of the front frame 14 by a bolt 35. The position of this bolt 35 is preferably past the center of the frame toward the end upon which the collar 33 is fixed.

A Y shaped draft yoke 36 comprises a member 37 and a member 38 joined by a bolt 39. The rear end of member 37 is pinned to the front frame at 40, and the rear end of the member 38 is pivotally connected to the swingable arm 34 at 41. The point of this pivot is preferably beyond the center of the arm toward its outer end. The forward end of the draft yoke is provided with the usual coupling means 41a for attachment to the drawbar 42 of the tractor hitch 11.

A rigid bar 43 is pivoted to the central region of the rear gang frame 15 along the front thereof in one of a series of holes 44. It has a plurality of holes 45 adapted to receive a latch pin 46. This latch pin is associated with a swivelled collar 47 fixed on cross member 48 of the front frame, and can be controlled from the seat of the tractor by a rope 49. It is yieldably retained in either latching or open position by a coil spring 50 which operates past dead center in either position.

The bar 43 is freely slidable through the swivelled collar 47. I also provide a stop bolt 51, which may be inserted in any one of a plurality of holes 52 to prevent the bar from sliding rearwardly beyond a predetermined point when the latch pin is disengaged.

To aid in closing the gangs when turning the disk harrow toward the open end of the gangs which, as illustrated, is the right side (considered in the forward travel of the implement), I provide a rigid link 53 pivoted to the fore part of the rear frame between the connection of the bar 43 and the closed end of the gangs. This link rests upon the rear part of the front gang frame. Extending forwardly from the link is a chain 54 which is connected to a bracket 55 on the tractor hitch.

The chain is supported and guided for free movement over the fore part of the front frame by grooved rollers 56, one of which is rotatably mounted on the pin 35 and the other on a pin 57.

In operation, it is assumed that the implement is pulled as shown in Figure 1, to the place where work is to commence. In this idling position, the gangs are held closed by the latch pin 46 engaging in one of the holes 45 in the bar 43. As the chain 51 performs no function at this time it will hang slack.

When ready to start working, the operator pulls the latch pin out of the hole 45 and allows it to remain disengaged from the bar 43.

The tractor is moved forward, and the parts automatically assume and maintain the positions shown in Figure 3. The gangs are positively opened by the forward shifting of the draft yoke, which swings the arm 34 forwardly, and through the control bar 27 and the fixed arm 26, exerts a force on the left rear corner of the rear gang to wheel the gang around the pivot 25. The right front portion of the front gang is pulled forward at the same time by the member 38 of the draft yoke, while the left front portion of the front gang tends to wheel rearwardly.

The design and construction is so balanced that the pull of the tractor will cause the gangs to assume the desired working angle and maintain this angle under normal working conditions without further use of the latch pin 46.

This is the first time, to my knowledge, that a control bar has been combined with a swinging bar and draft hitch in the manner disclosed, and caused to exert force directly on the rear corner of the rear gang on the side of the pivotal connection between the gangs. The effectiveness of control thus obtained has proved highly satisfactory, and is a marked improvement over any other gang controls known.

It enables me to employ a relatively short swinging arm between the control bar and the draft yoke, requiring less initial movement of the tractor to shift the gangs into working position. It results in relative simplicity of the working parts, and lightness of construction.

To adjust the implement so that the gangs will assume more or less angle, it is merely necessary to change the length of the rear section 28 of the control bar 27.

If a different temporary setting of the angle of the gangs is desired, the latch pin 46 may be dropped into any one of the holes 45 in the bar 43. As an emergency stop to prevent the gangs from spreading too far apart under abnormal conditions, the stop bolt 50 may come into use.

Assuming the gangs to be angled for working, and the tractor is turned to the right, the chain 54 is drawn forward by the swinging of the bracket 55 on the tractor hitch. This action pulls the free side of the rear gang forwardly and tends to drop the free side of the front gang rearwardly. Due to the connection of the link 53 toward the end of the pivotal working connection between the gangs, a slight rotative movement of the bracket 55 is sufficient to close the gangs sufficiently so that the rear gang readily follows the front gang in completing the turn.

The gangs may also be closed by backing the tractor. The initial movement will cause the control bar to exert a rearward pressure on the corner of the rear gang and start the gangs to closing. Further movement will cause the control bar to jackknife and the front gang to swing back into parallel with the rear gang. The gangs may be latched in this position by the latch pin 46.

What I claim is:

1. A disk harrow comprising two gangs of disks in tandem relation, a single fixed pivotal connection between the gangs and adjacent one end thereof, a swingable bar pivoted to the front gang intermediate the ends of the gang, a draft yoke having one part connected to the front gang and another part connected to the swingable bar, and a control bar connecting the swingable bar and the rear gang at the end adjacent the pivotal connection between the gangs.

2. A disk harrow comprising two gangs of disks in tandem relation, a pivotal connection between the gangs and adjacent one end thereof, a swingable bar pivoted to the front gang, a draft yoke having one part connected to the front gang and another part connected to the swingable bar near the center thereof, and a control bar connecting the swingable bar at the free end thereof and the rear gang at the end adjacent the pivotal connection between the gangs.

3. A disk harrow comprising a front gang of disks and a rear gang of disks pivotally connected near one end for closing and angling, a draft yoke pivotally secured to the front gang, and a control bar connecting the draft yoke and the rear corner of the rear gang on the end where the pivotal gang connection is located.

4. A disk harrow comprising a front gang of disks and a rear gang of disks pivotally connected near one end for closing and angling, a draft yoke pivotally secured to the front gang, a swingable bar pivoted to the front gang and to a part of the draft yoke, and a control bar connecting the swinging bar and the rear corner of the rear gang on the end where the pivotal gang connection is located.

5. A disk harrow comprising a front gang of disks and a rear gang of disks pivotally connected near one end for closing and angling, a draft yoke pivotally secured to the front gang, a swingable bar pivoted to the front gang at a point on the gang off center toward the end where the pivotal gang connection is located and to a part of the draft yoke, and a control bar connecting the swingable bar and the rear corner of the rear gang on the end where the pivotal gang connection is located.

6. A tandem disk harrow comprising a front gang of disks and a rear gang of disks pivotally connected together, a swingable bar having one end pivoted to the front gang, a draft yoke having one part connected to the front gang and another part to the swingable bar, and a gang control bar attached at one end to the rear gang and at the other to the swingable bar whereby forward pull on the draft yoke will force the gangs to angle, the control bar being provided with a flexible mid-joint adapted to jackknife when the gangs are closed.

7. A tandem disk harrow comprising a front gang of disks and a rear gang of disks pivotally connected together, a swingable bar having one end pivoted to the front gang between the ends of the gang, a draft yoke having one part connected to the front gang and another part to the swingable bar, and a gang control bar attached at one end to the rear gang and at the other to the swingable bar whereby forward pull on the draft yoke will force the gangs to angle.

8. A tandem disk harrow comprising a front gang of disks and a rear gang of disks pivotally connected together, a swingable bar having one end pivoted to the front gang intermediate the ends thereof, a draft yoke having one part connected to the front gang and another part to the swingable bar between the ends of the bar, and a gang control bar attached at one end to the rear gang and at the other to the swingable bar whereby forward pull on the draft yoke will force the gangs to angle.

9. A tandem disk harrow comprising a front gang of disks and a rear gang of disks pivotally connected together, a swingable bar having one end pivoted to the front gang, a draft yoke having one part connected to the front gang between the ends thereof and another part to the swingable bar intermediate the ends thereof, and a gang control bar attached at one end to the rear gang at the rear corner thereof on the same side of the disk harrow as the attachment of the control bar to the swingable bar and at the other to the swingable bar whereby forward pull on the draft yoke will force the gangs to angle.

10. A tandem disk harrow comprising a front gang of disks and a rear gang of disks pivotally connected together, a swingable bar having one end pivoted to the front gang between the ends of the gang, a draft yoke having one part connected to the front gang and another part to the swingable bar between the ends of the bar, and a gang control bar attached at one end to the rear gang at the rear corner thereof on the same side of the disk harrow as the attachment of the control bar to the swingable bar and at the other to the swingable bar whereby forward pull on the draft yoke will force the gangs to angle, the control bar being provided with a flexible mid-joint adapted to jackknife when the gangs are closed.

11. A disc harrow having two gangs of disks in tandem relation pivotally connected together for angling and closing, a swingable bar approximately half the length of a gang pivoted at one end to the front gang approximately midway of the gang, a member connecting the free end of the bar with the rear gang on the same side of the disk harrow to control the relatively angling of the gangs, and draft means having a part attached to the swingable bar between the ends of the bar, whereby draft force will be transmitted through the swingable bar and the said member to positively angle the gangs.

WILLIAM E. GOBLE.